United States Patent Office 2,815,116
Patented Dec. 3, 1957

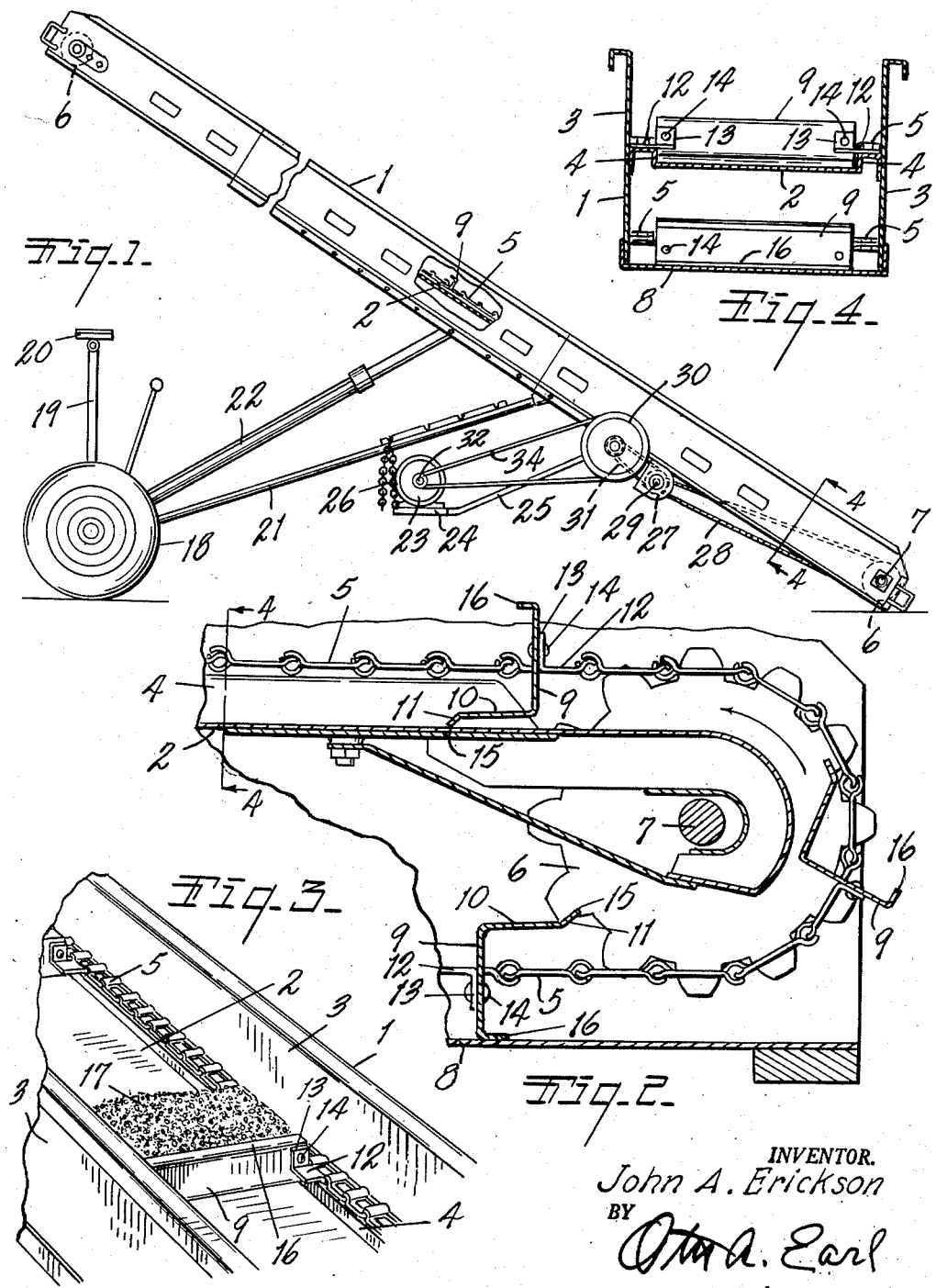

2,815,116

FLIGHT TYPE CONVEYOR WITH FORWARDLY PROJECTING LOAD SUPPORTING ARMS ON THE FLIGHTS

John A. Erickson, Manhattan, Kans., assignor to Viking Manufacturing Company, Manhattan, Kans.

Application January 25, 1954, Serial No. 405,975

2 Claims. (Cl. 198—172)

This invention relates to a flight type conveyor with forwardly projecting load supporting arms on the flights.

The main objects of this invention are:

First, to provide a conveyor of the flight type in which the flights are so shaped and transported as to prevent their riding over material conveyed on the conveyor way.

Second, to provide a conveyor having these advantages which may be operated with a relatively small amount of power and wear on the parts.

Third, to provide a structure having these advantages which may be readily incorporated in a portable elevator adapted for various uses.

Objects relating to details and economies of the invention will appear from the description to follow. The invention is defined and pointed out in the claims.

A preferred embodiment of the invention is illustrated in the accompanying drawing, in which:

Fig. 1 is a fragmentary side elevation of a conveyor embodying my invention as embodied in an elevator, the conveyor being shown in an elevated position.

Fig. 2 is an enlarged longitudinal section of the forward end of the conveyor.

Fig. 3 is a fragmentary top perspective view, the material conveyed being shown conventionally.

Fig. 4 is a transverse section on a line corresponding to line 4—4 of Figs. 1 and 2.

In the accompanying drawing I have embodied my invention in a portable conveyor of the elevator type, the carriage and adjusting means being substantially that disclosed in my application for Letters Patent filed July 26, 1952, Serial No. 301,079, which has issued as Patent No. 2,759,591.

The conveyor of my invention designated generally by the numeral 1 comprises a way bottom 2 on which the material conveyed is slidably supported and parallel side walls 3. Chain guide rails 4 are disposed at the juncture of the bottom with the side walls. The conveyor chains 5 are supported by these rails and are further supported by sprockets 6 disposed at the ends of the conveyor, the lower sprocket being fixed to the driving shaft 7.

In the embodiment illustrated the conveyor is provided with a return guideway 8 which slidably supports the flights as they are translated therealong, see Fig. 2. The flights 9 are of forwardly facing angle section, the arms 10 terminating in forwardly and downwardly inclined flange portions 11 which are slidably supported by the bottom of the way as the flights are translated therealong by the chains 5.

Opposed pairs of links 12 of the chains 5 are provided with upturned lugs 13 to which the flights are fixedly secured as by the rivets 14. The connections for the flights to the chain links is such that the draft pull on the flights is mainly in the plane of the chains on their forward travel. However, the points of attachment are located somewhat above the horizontal centers of the flights so that the pull on the flights acts to urge their edges 15 into slidingly supported engagement with the bottom of the way during the forward travel of the flights. The arms 10 are disposed adjacent to but spaced from the way bottom 2, between the upper edges of the flanges 11 and the connections of the arms to the flights, and project forwardly a substantial distance from their connections to the flights to support thereon a substantial mass of the material being conveyed to hold the lower edges of the flanges down in sliding engagement with the way bottom to prevent the flights from riding over the material being conveyed. The portion of the weight of the load on the arms which is transmitted to the way bottom is all through the lower edges of the flanges to provide a considerable pressure of said edges on the way bottom. Also the upper edges of the flanges are spaced a substantial distance forwardly from the connection of the flights to the chains whereby direction of the thrust of the lower edges of the flanges against the bottom is at a substantial angle to the bottom instead of more or less parallel thereto, to prevent the lower portions of the flights from tilting rearwardly and riding over the material being conveyed and to prevent binding of said lower portion between the chains and the bottom.

The upper edges of the flights are provided with forwardly projecting flanges 16 which stiffen the flights also provide shoe portions which slidably engage the return way 8, as shown in Fig. 2.

With this arrangement the material conveyed conventionally indicated at 17 in Fig. 3, is effectively translated along the way bottom and the flights are maintained with their forward edges in sliding contact with the bottom. The load also acts to counteract the tendency for the flights to lift and ride over the material translated. This avoids the use of holddown strips or other holddown means for the chains. Applicant is aware of the use of holddown strips for the chains to prevent the lifting of the flights over the material translated. Such holddown strips add greatly to the wear on the chains and rails and also add greatly to the power requirements and to keeping the conveyor in working condition and minimizes clogging and labor in cleaning.

The conveyor of my invention is well adapted for handling various materials such as brick, stone, tile, sand, gravel, excavating material, concrete and the like.

I have illustrated my invention as embodied in a portable conveyor of the elevator type. The carriage designated generally by the numeral 18, is provided with an upright 19 provided with a seat 20 for the conveyor when it is in its lowered position. Tension rods 21 are connected at their rear ends to the carriage and thus their forward ends are suitably connected to the conveyor. The hydraulic ram 22 is provided for raising and lowering the conveyor. I have not illustrated any details of this as they constitute features of the invention disclosed in my said application for patent.

The power unit 23 is mounted on a platform 24 provided with forwardly projecting arms 25 pivotally connected to the conveyor. The hanger chain 26 connects the platform 24 to the tension rods 21. The driving shaft 7 is connected to the power unit, desirably an internal combustion engine, by means of the sprocket wheel 27 shown by dotted lines, the sprocket chain 28 and suitable sprocket on the shaft 29. The shaft 29 is connected to the pulley 30 by means of the belt or sprocket chain 31. The shaft 32 of the motor is connected to the pulley 30 by the belt 34. This driving connection is, in effect, a speed reducing drive connection power unit.

I have illustrated and described my invention in a very practical embodiment thereof. I have not attempted to illustrate or describe other embodiments or adaptations which I contemplate as it is believed this disclosure will enable those skilled in the art to embody or adapt my invention as may be desired.

Having thus described my invention, what I claim as new and desire to secure by Letters Patent is:

1. In a conveyor of the flight type, the combination of a conveyor way comprising a bottom and side walls, upwardly facing chain guide rails disposed at the juncture of the bottom with the side walls and below the tops of the side walls, conveyor chains, chain supporting and driving sprockets disposed at the ends of the way to coact with the rails in supporting the forwardly traveling reaches of the chains, opposed pairs of spaced links of the chains being provided with upwardly projecting lugs intermediate their ends, and flights fixedly mounted on said lugs and projecting thereabove and therebelow to travel between the rails and having forwardly projecting arms at their lower edges terminating in downturned forwardly projecting flanges slidably supported by the bottom of the way, said arms being disposed adjacent to but spaced from said bottom, between their flanges and their connections to the flights, and projecting forwardly a substantial distance from the lower edges of the flights to support thereon a substantial mass of the material being conveyed to hold the lower edges of the flanges engaged with said bottom when the flights are loaded and being loaded, said lower edges of the flanges being spaced forwardly a substantial distance from the connection of said flights to the lugs to prevent rearward tilting movement of the lower portions of the flights, and binding of said lower portion between the chains and the bottom of the way.

2. In a conveyor of the flight type, the combination of a conveyor way comprising a bottom, laterally spaced upwardly facing chain guide rails, drive conveyor chains, flights fixedly mounted on opposed links of the chains and projecting thereabove and therebelow to travel between the rails and having forwardly projecting arms at their lower edges terminating in downturned forwardly projecting flanges slidably supported by the bottom of the way, the points of attachment of the flights to the chains being such that the draft pull on the flights is mainly in the plane of the chains but also acts to urge the forward edges of the arms of the flights into slidingly supported engagement with the bottom of the way during the forward travel of the flights, said arms being disposed adjacent to but spaced from the bottom between their flanges and their connections to the flights and projecting forwardly a substantial distance from the flights to support thereon a substantial mass of the material being conveyed to hold said flanges engaged with the bottom when the flights are loaded and being loaded.

References Cited in the file of this patent

UNITED STATES PATENTS

| | | |
|---|---|---|
| 668,378 | Korth | Feb. 19, 1901 |
| 748,576 | Bivert | Jan. 5, 1904 |
| 993,650 | Clements | May 30, 1911 |
| 1,377,686 | Hulett | May 10, 1921 |
| 1,535,386 | Walker et al. | Apr. 28, 1925 |
| 1,550,365 | Jones | Aug. 18, 1925 |
| 2,286,580 | Schroeder | June 16, 1942 |
| 2,368,353 | Fulper | Jan. 30, 1945 |
| 2,400,502 | Hapman | May 21, 1946 |
| 2,606,648 | Smoker | Aug. 12, 1952 |

FOREIGN PATENTS

| | | |
|---|---|---|
| 695,430 | Germany | Aug. 24, 1940 |